United States Patent Office 2,885,788
Patented May 12, 1959

2,885,788

PROCESS FOR FREEZE-DRYING OF MILK

Abraham Leviton, Washington, D.C., assignor to the United States of America as represented by the Secretary of Agriculture No Drawing. Application May 26, 1958
Serial No. 737,984

2 Claims. (Cl. 34—5)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the government of the United States of America.

This invention relates to freeze-drying milk and has among its objects an efficient process resulting in a product which is non-caking, non-hygroscopic and which is quickly reconstituted by the addition of water to produce milk having substantially the appearance, flavor and nutritional value of fresh milk.

By freeze-drying is meant the removal of water, as vapor, from frozen material to be dried without disturbing the structure of the frozen state. Freeze-drying techniques have been applied to various aqueous liquids, including blood, fruit and vegetable juices and milk. It is a relatively expensive method for drying because it requires high vacuum and very low condenser temperatures; moreover, it is a slow, tedious process because the water must be evaporated at sub-zero temperatures, at which the vapor pressure of water is exceedingly small.

In conventional processes, the liquid to be dried is frozen onto the interior surface of a suitable vessel in a layer from a few millimeters to perhaps an inch in thickness, a pressure of the order of a few mm. of mercury is established and milk heat is applied to the back of the surface supporting the frozen film. If thawing and "puffing" is to be avoided, the maximum rate of drying has usually been of the order of about 1 mm. of thickness per hour. Heat transfer and vapor flow through the drying layer is usually very slow, thus necessitating inordinately long drying periods. Furthermore, the formation of layers of uniform thickness is difficult to obtain and inasmuch as the time required for drying is determined by the maximum thickness an unnecessarily long time may be required to dry a relatively small portion of sample. At best the drying is nonuniform and this is reflected in the product.

According to the invention the above difficulties are overcome and the objects of the invention are achieved by a freeze-drying process wherein the liquid milk is first frozen onto a cold surface in a succession of thin layers until a thickness of about 1 to 3 mm. is attained. This is accomplished by repeatedly contacting a chilled surface with fluid milk to form a multilayer film of the desired thickness. The pressure is then reduced to less than about 1 mm. and the film is gradually warmed to a temperature insufficient to thaw the film but sufficient to effect evaporation of the moisture until only a porous, solid layer of dried milk remains.

My process differs from previously known similar processes in the following principal respects:

(a) The film of frozen milk on the evaporator surface comprises a succession of thin layers rather than a single thick layer. This produces a denser layer having finer ice crystals embedded in an amorphous solid. Such a layer is more uniform, a much better conductor of heat, yields a more porous solid when dry, permits much faster diffusion of vapor during the drying process, and yields a dry product that is non-hygroscopic and readily reconstitutible.

(b) The dehydration step is conducted at a much lower effective pressure, thus reducing both the temperature and the time required for complete dehydration. It is an essential feature of the invention that the pressure and temperature during evaporation be low enough that the film of milk not "puff" and that even incipient thawing be carefully avoided. In this way the ratio between the volume of ice crystals and the volume of amorphous material is retained, the structure is maintained, and with it, good conductivity toward heat and vapor flow. This suggests the use of a condenser surface of sufficient effective area to handle adequately all water vapor evolved from the frozen milk film and at a temperature sufficiently low to hold the partial pressure of water vapor substantially below about 0.5 mm. This requires a temperature below about —25° C. at the condensing surface so that it is usually desirable to have the cooling fluid below —30° aid preferably below —50°.

While milk begins to freeze when cooled only a few degrees below zero, in applying the film of frozen milk to the evaporator surface in the practice of the invention, it is necessary to first chill the surface to at least about —30° C. and preferably —70° in order to obtain a film of frozen milk having the essential structure; that is microscopic ice crystals embedded in a dense, glassy, amorphous layer of frozen milk. When frozen at higher temperatures, the ice crystals are larger and the amorphous phase of the solid layer constitutes a larger proportion of the layer.

When a frozen milk film of the above desired type is dried while under a total pressure substantially less than about 1 mm., the rate of evaporation is much higher than in conventional processes. In the latter, a drying rate of 1 mm. thickness per hour is considered satisfactory, while in the present process the drying rate is usually 3 to 4 mm. thickness per hour. This high drying rate entails rapid removal of heat, as latent heat of vaporization, from the film of frozen milk and consequently permits, and indeed requires, an equally rapid application of heat to the film. This is conveniently done by circulating water or other heating fluid to the interior side of an exterior evaporator surface supporting the film. In general, heat should be supplied as rapidly as possible without altering substantially the structure of the film. I have found that when the evaporator surface is glass of 1–2 mm. thickness the heating fluid may be water at 20–30° C. The maximum allowable temperature of the heating fluid will depend to a great extent on the material and thickness of the evaporator wall and the density and thickness of the film of frozen milk.

The practice of the invention is illustrated by the following examples.

*Example 1*

A glass tube 15 mm. O.D. and 13 mm. I.D., sealed at the lower end, was filled with a Dry-Ice-alcohol mixture and then dipped in homogenized, pasteurized fresh milk previously cooled to about 0° C. The tube was quickly withdrawn and held a few seconds until the layer of milk thereon had thoroughly hardened. The dipping and withdrawal were repeated several times until a smooth, uniform layer of frozen milk about 1.6 mm. thick had formed. The coated tube, the frozen layer of which was surrounded by a perforated plastic tube closed at its lower end, was inserted concentrically into a length of 30 mm., I.D., tubing through a rubber stopper making an air-tight seal at the open end of the outer tube. The outer tube was connected through a side-tube to an efficient vacuum pump system. The lower portion of the outer tube was immersed in a Dry-Ice-alcohol bath and served as a condenser during the drying process.

The pump was put into operation and the pressure in the system at the trap was reduced to 0.2 micron, at which point it remained steady. The Dry-Ice-alcohol mixture was then removed from the inner tube, and water at 23–26° C. was circulated in it instead. After 20 min. the pump was stopped, the vacuum was broken and the tube carrying the now dried milk was removed. The soft, porous, dry milk product was scraped from the tube to which it adhered lightly. It had a moisture content of 4.1% and readily dissolved in the appropriate amount of water to yield reconstituted milk having substantially the same appearance, odor and flavor of whole fresh milk. Because of the mild conditions used in drying the product, the nutritional value of the product was unimpaired. The product was non-hygroscopic and even after storage in an open vessel for six weeks retained its original body, texture and solubility.

*Example II*

Another experiment was conducted substantially as described in Example I except that the film of frozen milk on the evaporator surface was 2.7 mm. in thickness. Heating was accomplished with water at 29–30° C. and the drying time was 40 min. Moisture content of the product was 7%, the product otherwise being substantially identical to that obtained in Example I.

While in the above examples I have used whole milk, equally advantageous results are obtained in drying skim milk, buttermilk or whey. Moreover these products may be concentrated to a higher solids content prior to freeze-drying and the yield of solids may be increased substantially thereby.

I claim:

1. The process for freeze-drying milk comprising repeatedly contacting a chilled surface with fluid milk to form a multilayer film of frozen milk of about 1 to 3 mm. thickness on the surface, and subjecting the film to a pressure of less than about 1 mm. and a temperature insufficient to thaw the film but sufficient to effect evaporation of the moisture, until a porous solid layer of dried milk remains.

2. The process of claim 1 wherein the film of frozen milk is formed at a temperature below about −30° C.

References Cited in the file of this patent
UNITED STATES PATENTS

| 2,435,503 | Levinson et al. | Feb. 3, 1948 |
| 2,533,125 | Levinson et al. | Dec. 5, 1950 |